United States Patent
Gani

(10) Patent No.: US 10,422,860 B2
(45) Date of Patent: Sep. 24, 2019

(54) PROXIMITY SENSOR WITH INTEGRATED ALS

(71) Applicant: STMICROELECTRONICS PTE LTD, Singapore (SG)

(72) Inventor: David Gani, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 116 days.

(21) Appl. No.: 15/818,465

(22) Filed: Nov. 20, 2017

(65) Prior Publication Data

US 2019/0154801 A1  May 23, 2019

(51) Int. Cl.
- *G01S 7/48* (2006.01)
- *G01J 1/42* (2006.01)
- *G01S 7/481* (2006.01)
- *G01S 17/08* (2006.01)

(52) U.S. Cl.
CPC ........... *G01S 7/4808* (2013.01); *G01J 1/4204* (2013.01); *G01S 7/4813* (2013.01); *G01S 17/08* (2013.01)

(58) Field of Classification Search
CPC ...... G01S 7/4808; G01S 17/08; G01S 7/4813; G01J 1/4204

USPC .................................................... 250/214 AL
See application file for complete search history.

(56) References Cited

U.S. PATENT DOCUMENTS

| | | | | |
|---|---|---|---|---|
| 8,330,945 B2* | 12/2012 | Choi | ...................... | B82Y 20/00 250/214 AL |
| 8,928,893 B2* | 1/2015 | Findlay | ................ | H03K 17/941 250/214 AL |

* cited by examiner

*Primary Examiner* — Seung C Sohn
(74) *Attorney, Agent, or Firm* — Seed IP Law Group LLP

(57) ABSTRACT

A semiconductor package that is a proximity sensor includes a light transmitting die, a light receiving die, an ambient light sensor, a cap, and a substrate. The light receiving die and the light transmitting die are coupled to the substrate. The cap is coupled to the substrate forming a first chamber around the light transmitting die and a second chamber around the light receiving die. The cap further includes a recess with contact pads. The ambient light sensor is mounted within the recess of the cap and coupled to the contact pads. The cap includes electrical traces that are coupled to the contact pads within the recess coupling the ambient light sensor to the substrate. By utilizing a cap with a recess containing contact pads, a proximity sensor can be formed in a single semiconductor package all while maintaining a compact size and reducing the manufacturing costs of proximity sensors.

20 Claims, 5 Drawing Sheets

PROXIMITY SENSOR WITH INTEGRATED ALS

BACKGROUND

Technical Field

The present disclosure is directed to a proximity sensor including a light transmitter, a light receiver, and an ambient light sensor.

Description of the Related Art

As consumer demand increases for smaller electronic devices with large screens, semiconductor packages must be made as small as possible to use the available space within the electronic device. For example, a semiconductor package may be a proximity sensor. More specifically, the proximity sensor may contain both a light transmitter and a light receiver. In the proximity sensor, the light transmitter and the light receiver are isolated from one another. In other words, the light receiver and light transmitter are positioned in the proximity sensor package such that the light receiver only receives light from the light transmitter under certain circumstances. For example, the light transmitter emits pulses of light at a frequency to detect when a body part or face of the user comes near a cellphone. The light transmitter will emit a pulse of light at a certain frequency which will be reflected by a user's face or body part when the user comes close to the proximity sensor. The reflected transmitted light is then received by the light receiver. Once the light receiver receives the reflected light originally emitted from the light transmitter, the proximity sensor detects that a user is in close proximity of the screen and turns off the cellphone screen or locks the device to avoid undesired inputs.

Ambient light can disrupt this process. More specifically, ambient light can cause the cellphone or the electronic device to malfunction or lock up at undesired times. For example, if the light receiver receives ambient light at a similar frequency that it is calibrated to be received from the reflected light originally emitted from the light transmitter, the screen of the cellphone or the electronic device may lock up due to an incorrect determination by the light receiver. Therefore, it is desired to have an ambient light sensor to make sure that the ambient light is taken into account while the light receiver is taking readings to determine if a user is close to a screen of a cellphone or an electronic device. In turn, in order to avoid undesired determinations by the light receiver, the electronic device or cellphone has to contain a first semiconductor package that includes a light transmitter and a light receiver, and a second semiconductor package that includes an ambient light sensor.

Also, an ambient light sensor is helpful within a cellphone or an electronic device with a screen because the ambient light sensor allows the brightness of the screen of the cellphone or the electronic device to adapt and change based on various types of ambient lighting. Because two semiconductor packages are needed to make sure an incorrect determination by a proximity sensor due to ambient light does not occur, causing the electronic device or cellphone to malfunction or lock up, significant amounts of space are taken up by the two semiconductor packages that work together as a proximity sensor to avoid inappropriate detections and determinations.

BRIEF SUMMARY

The present disclosure provides semiconductor packages that include a light transmitter, and a light receiver semiconductor dies covered by a cap. The cap includes a further semiconductor die in the cap, positioned overlying the semiconductor die. In one embodiment, the further semiconductor die is an ambient light sensor. According to one embodiment, a package includes a substrate, a first die including a light transmitter, a second die including a light receiver, a third die that has an ambient light sensor positioned in the cap. The substrate includes a first side and a second side, the first side being opposite the second side. The substrate includes contact pads on the first side and electrical components, the electrical components are coupled the contact pads. The first die and the second die are both coupled to the substrate on the second side. Also, the first die and the second die are adjacent to each other. The contact pads of the substrate will allow the completed semiconductor packages to be mounted within an electronic device such as a cellphone, a tablet, a computer, or some other electronic device. After the first die and the second die are coupled to the second side of the substrate, electrical connections are formed between the dice and the substrate. The electrical connections may be wires, solder, conductive adhesive, or some other electrical connections or combinations of electrical connections. The electrical connections are coupled to the electrical components of the substrate, and in turn, the dice are coupled to the contact pads of the substrate. Once the electrical connections are formed between the dice and the substrate, a cap is coupled to the substrate and the first die. The cap may be coupled to the substrate and the die by a conductive adhesive, plastic welding, a non-conductive adhesive or some other coupling technique or combinations of coupling techniques.

The cap includes a light barrier, two openings, a recess, contact pads, electrical traces, and an ambient light sensor. The contact pads are located within the recess of the cap and coupled to the electrical traces in the cap. The ambient light sensor is positioned in the recess of the cap and is coupled to the contact pads. In turn, the contact pads and the electrical traces couple the ambient light sensor to the first die that includes the light receiver and couple the ambient light sensor to the substrate. Furthermore, one of the openings of the cap is aligned with the light transmitting portion of the first die and the other opening of the cap is aligned with the light receiving portion of the second die. The openings allow for light pass in and out of the semiconductor package.

By utilizing a cap with a recess that contains contact pads, an ambient light sensor may be mounted within the cap. In turn, a semiconductor package may be formed that includes a first die having a light transmitting portion, a second die having a light receiving portion, and an ambient light sensor. Allowing for a proximity sensor that can lock a screen and change the brightness of the screen without having any inappropriate determinations or detections by a proximity sensor, all while reducing the number of semiconductor packages and the amount of space a proximity sensor takes up within an electronic device.

BRIEF DESCRIPTION OF THE SEVERAL VIEWS OF THE DRAWINGS

In the drawings, identical numbers identify similar elements or acts unless the context indicates otherwise. The sizes and relative positions of the elements in the drawings are not necessarily drawn to scale.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
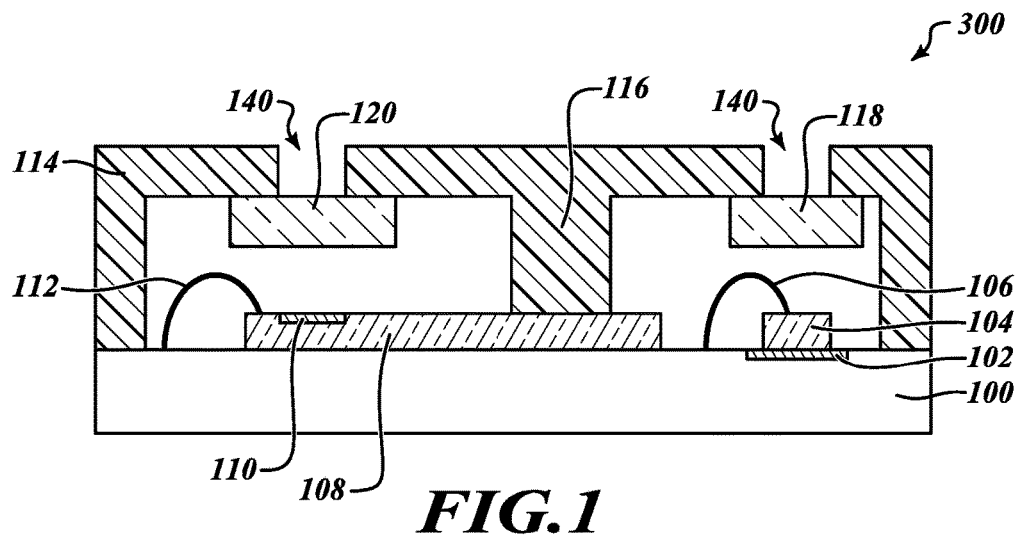
FIG. 1 is a cross-sectional side view of a proximity sensor including a light transmitter and a light receiver.
Figure 2:
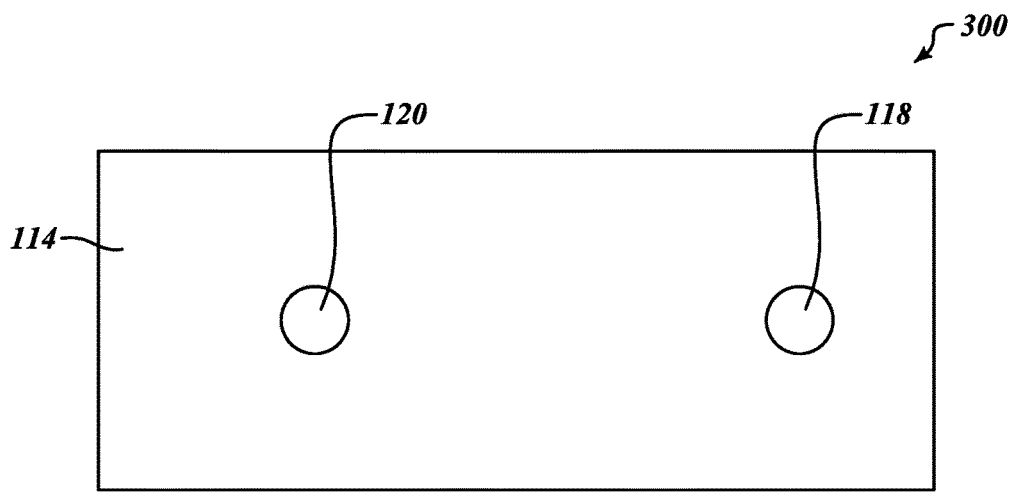
FIG. 2 is a top plan view of the proximity sensor in FIG. 1.

FIGS. 1 and 2 illustrate a semiconductor package 300 that is a proximity sensor 300. The proximity sensor 300 includes a substrate 100, a first die 104, a second die 108, electrical connections 106, 112, and a cap 114 with apertures 140.

In the proximity sensor 300 the first die 104 is a light transmitting die 104 and the second die 108 is a light receiving die 108. The light transmitting die 104 and the light receiving die 108 are coupled to the substrate 100. The light receiving die 108 and light transmitting die 104 may be coupled to the substrate 100 by an adhesive. The adhesive may be a glue, a die attach film, a conductive adhesive, a non-conductive adhesive, or some other adhesive material or combination of adhesive materials. The light receiving die 108 includes a light receiving portion 110. The light receiving die 108 and the light transmitting die 104 coupled to the substrate 100 are positioned adjacent to each other on the substrate 100. The substrate 100 may include metal pads 102 that the light transmitting die 104 or the light receiving die 108 are coupled to by an adhesive. The adhesive may be solder or any other conductive adhesive material or combinations of conductive adhesive materials. Additionally, the light transmitting die 104 and the light receiving die 108 may be electrically coupled to the substrate by electrical connections 106, 112. The electrical connections 106, 112 may be conductive wires, solder, or some other electrical connection technique. A cap 114 is coupled to the substrate 100 and a portion of the light receiving die 108. The cap 114 is made of an electrically insulating material or a non-conductive material. The cap 114 includes a pair of apertures 140, which are openings that extend through the cap. A respective aperture 140 is aligned with the light receiving portion 110 of the light receiving die 108 and the other respective aperture is aligned with the light transmitting die 104. A pair of windows 118, 120 is coupled to the cap. Each respective window 118, 120 is aligned with a respective aperture 140. Furthermore, each window of the pair of windows 118, 120 is made of a transparent material that allows light to pass through the apertures 140. The cap 114 further includes a light barrier 116. The light barrier 116 is a wall of the cap that separates the light receiving portion 110 of the light receiving die 108 from the light transmitting die 104. More specifically, the light barrier stops cross-talk between the light transmitting die 104 and the light receiving portion 110 of the light receiving die 108. In other words, the cap 114 forms two chambers, one respective chamber contains the light receiving portion 110 of the light receiving die 108, and the other respective chamber contains the light transmitting die 104. The light receiving die 108 may have a portion that extends into the second chamber of the cap 114 that contains the light transmitting die 104.

If the proximity sensor 300 of FIGS. 1 and 2 is mounted within a cellphone or an electronic device, another semiconductor package that contains an ambient light sensor is often mounted within the cellphone or electronic device as well. An ambient light sensor package is often used because there is a chance of incorrect determinations or detections by the light receiving die 108 without taking into account the ambient light of a room or an external environment when the light receiving die is determining to lock the screen or not. An ambient light sensor package is also used to allow for the cellphone screen or electronic device screen to darken or brighten depending on the ambient light within the room or the external environment. The proximity sensor in FIGS. 1 and 2 has only two die and if additional semiconductor packages are needed, using separate packages for each determination above results in higher costs and more space being taken up within the cellphone or electronic device.

This example illustrates the shortcomings the inventors realized as problems that should be solved in semiconductor packages similar to the proximity sensor 300, which only contains a light transmitting die 104 and a light receiving die 108.

The present disclosure describes proximity sensors 400, 500, 600, 700 and the formation of them that overcome many of the shortcomings of the proximity sensor 300 above and other similar proximity sensors. The present disclosure describes various embodiments of proximity sensors 400, 500, 600, 700 being formed by utilizing a cap that has a recess for receiving one or more separate semiconductor die in the same proximity sensor package as a light receiving die and a light transmitting die, all while maintaining the proximity sensors compactness. In one embodiment, the semiconductor die in the cap is an ambient light sensor, but it can also be an number of other die, such as a display driver, an ASIC, a fingerprint sensor, a processor or other die. By incorporating the ambient light sensor in the cap of the proximity sensor, the use of two semiconductor packages is avoided.

Figure 3:
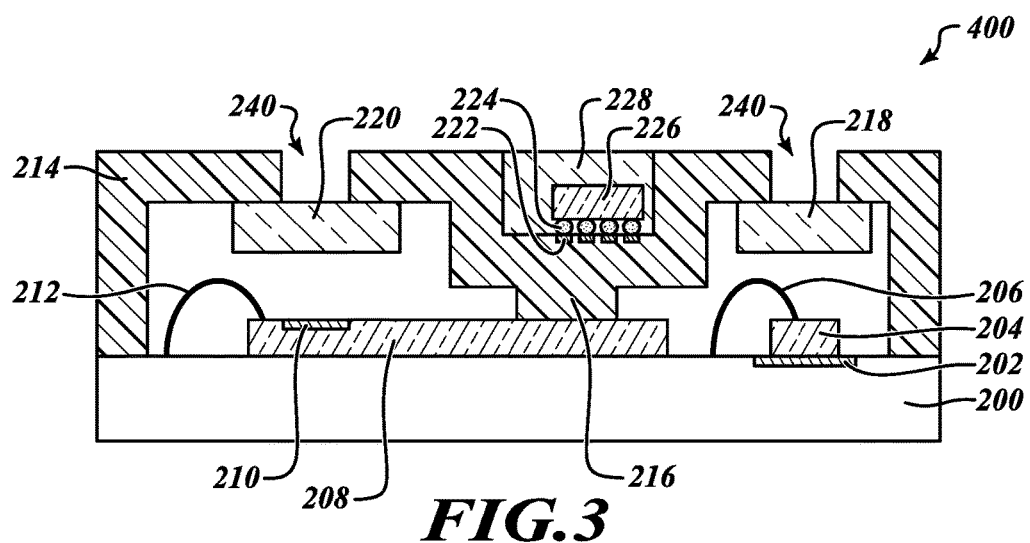
FIG. 3 is a cross-sectional side view of an embodiment of a proximity sensor formed utilizing a cap with a recess and an ambient light sensor.

FIG. 3 illustrates one embodiment of the present disclosure for providing a proximity sensor 400 including a substrate 200, a light transmitting die 204, a light receiving die 208, electrical connections 206, 212, third semiconductor die 226. In one embodiment the third semiconductor die is an ambient light sensor, therefore, it will also be referred to as an ambient light sensor 226, even though it could be any other type of semiconductor die and a cap 214 with apertures 240 and a recess 228. Having die 226 be an ambient light sensor provides a number of benefits to provide a compact package because the first die 208 contains circuits to process received light and putting the ambient light sensor permits a low cost and fast way to connect the ambient light sensor to a die having circuits to process light signals via contacts from the cap 214 to the substrate 200 and from it to the die 208.

In the proximity sensor 400, the light transmitting die 204 and the light receiving die 208 are coupled to the substrate 200. The substrate 200 may be a PCB, a lead frame, or another substrate material. The substrate 200 includes contact pads and electrical components, the contact pads are coupled to the light transmitting die 204 and the light receiving die 208 through the electrical components within the substrate 200. For example, if the substrate 200 is a PCB, the substrate will have several various contact pads and electrical traces coupling the light transmitting die 204 and the light receiving die 208 to the contact pads of the substrate 200 so the proximity sensor 400 can be mounted within an electronic device. The electronic device may be a cellphone, a laptop, a calculator, a tablet, or some other electronic device. The light transmitting die 204 and the light receiving die 208 may be coupled to the substrate 200 by an adhesive, solder, or some other attachment or adhesive material.

In this embodiment of the proximity sensor 400, the light transmitting die 204 is coupled to a metal pad 202 by solder or some other conductive adhesive. The metal pad 202 is coupled to the electrical traces within the substrate 200 which are coupled to the contact pads of the substrate 200 so the proximity sensor 400 may be mounted within an electronic device. Furthermore, the light transmitting die 204 and the light receiving die 208 are coupled to the substrate by electrical connections 206, 212. The electrical connections 206, 212 in the proximity sensor 400 are conductive wires. However, in alternative embodiments, the electrical connections 206, 212 may be solder, a ball grid array, or some other electrical connection or combination of electrical connections.

In the proximity sensor 400, a cap 214 is coupled to the substrate 200. The cap may be a plastic material, a ceramic material, a non-conductive material, an insulating material, or some other non-conductive material suitable for forming a cap of a semiconductor package. The cap 214 includes a pair of apertures 240, a pair of windows 218, 220, a light barrier 216, a recess 228, contact pads 222 within the recess 228 and electrical traces throughout the cap 214. One respective aperture 240 of the pair of apertures 240 is aligned with a light receiving portion 210 of the light receiving die 208. The light receiving portion 210 may be a light pixel detector, a photoemission detector, a photoelectric detector, or some other light sensing detector or light receiving detector. The other respective aperture 240 of the pair of apertures 240 is aligned with the light transmitting die 204. The light transmitting die 204 includes a light transmitting portion which may be a light emitting diode (LED) or some other light emitting device. The pair of windows 218, 220 has a first window 218 and a second window 220. The first window 218 is coupled to the cap 214 and aligned with the respective aperture 240 that is aligned with the light transmitting die 204. The second window 220 is coupled to the cap 214 and aligned with the respective aperture 240 that is aligned with the light receiving portion 210 of the light receiving die 208. The first and second windows 218, 220 are coupled to the cap by glue, an adhesive, or some other adhesion material or adhesion technique. The recess 228 is located between the pair of apertures and is aligned with the light barrier 216. The light barrier 216 forms a first chamber around the light receiving portion 210 of the light receiving die 208 and forms a second chamber around the light transmitting die 204. Furthermore, the recess 228 receives an ambient light sensor (ALS) 226. In other words, the ambient light sensor 226 is placed within the recess 228. The ambient light sensor 226 is coupled to the contact pads within the recess 228. The ambient light sensor in this embodiment of the proximity sensor 400 is coupled to the contact pads by solder balls 224. Additionally, the recess 228 is filed with a transparent material that encases the ambient light sensor 226 and the solder balls 224. The electrical traces through the cap 214 form various electrical connections within the proximity sensor 400. For example, the electrical traces may form electrical connections between the light receiving die 208 and the ambient light sensor 226, the light transmitting die 204 and the ambient light sensor 226, the substrate 200 and the ambient light sensor 226, or any other electrical connections that need to be formed to allow the proximity sensor to function appropriately or as needed. The electrical traces are coupled to the contact pads 222 within the recess 228 of the cap 214.

By positioning the recess 228 between the pair of apertures 240 and aligned with the light barrier 216, the ambient light sensor 226 is incorporated into the cap 214 of the proximity sensor 400. By incorporating the ambient light sensor 226 in the cap 214, the proximity sensor 400 remains compact. In addition, by incorporating the ambient light sensor 226 in the cap 214, it removes the need of adding a second semiconductor package with an ambient light sensor to a cellphone or an electronic device. In turn, this reduces the overall cost of manufacturing electronic devices that include a proximity sensor because only one semiconductor package is needed to be produced instead of two semiconductor packages, one containing a light transmitting die and a light receiving die and another containing an ambient light sensor. In addition, utilizing this proximity sensor 400 with the ambient light sensor 226 incorporated in the cap 214, the overall footprint or space that the proximity sensor 400 fills within an electronic device is significantly reduced as well. The die 108 already has a light sensor 210.

Figure 4:
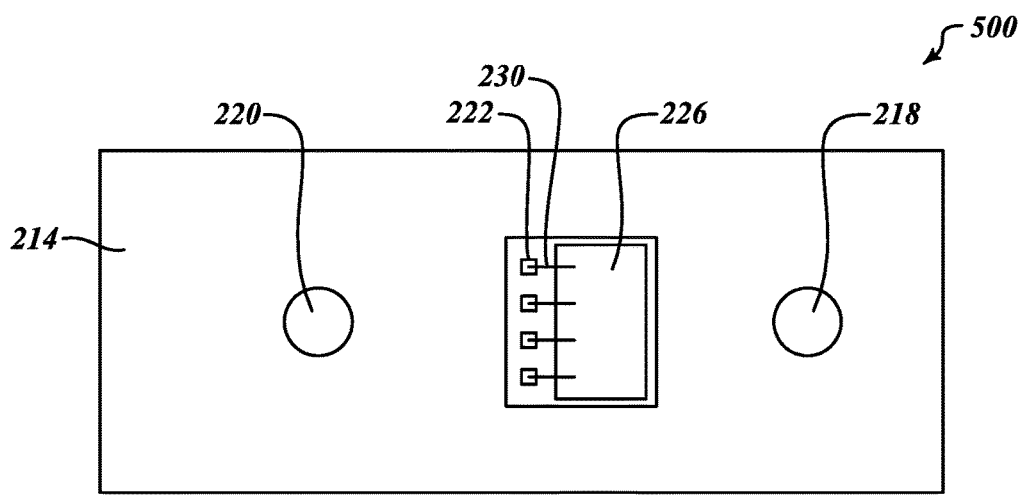
FIG. 4 is a top plan view of an alternative embodiment of a completed proximity sensor formed utilizing a cap with a recess and an ambient light sensor.

FIG. 4 is a top plan view of an alternative embodiment of a proximity sensor 500. This alternative embodiment of the proximity sensor 500 is very similar to the embodiment of the proximity sensor 400 in FIG. 3. However, in this alternative embodiment of the proximity sensor 500, the ambient light sensor 226 is coupled to the cap 214 within the recess 228 by an adhesive, and is electrically coupled to contact pads 222 within the recess 228 by a plurality of wires 230 instead of solder balls 224 as in FIG. 3.

FIGS. 5-8 are directed to successive steps in a method of forming various embodiments of the proximity sensor 400, 500, 600, 700.

Figure 5:
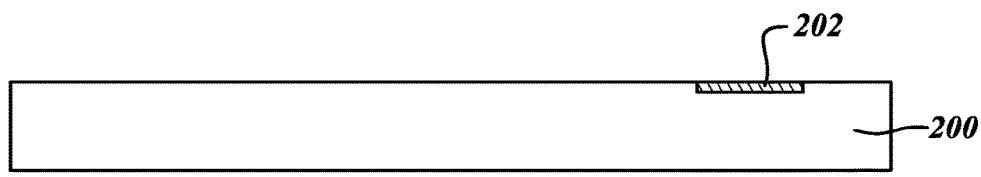
FIGS. 5-8 are cross-sectional side view of successive steps of a method utilizing a cap with a recess and an ambient light sensor to form an embodiment of a completed proximity sensor.

FIG. 5 illustrates a substrate 200. The substrate 200 in the process illustrated is a PCB. However, the substrate 200 may be a PCB, a lead frame, or another support material or appropriate substrate material for a semiconductor package. The substrate 200 may be a metal material, a plastic material, a non-conductive material, a conductive material, or some other combination of conductive and non-conductive materials. The substrate includes contact pads that will be used to couple the completed proximity sensor 400, 500, 600, 700 within an electronic device. Furthermore, in this embodiment of the proximity sensor 400, the substrate 200 includes a contact pad 202. The contact pad 202 will couple the light transmitting die 204 to the substrate 200.

Figure 6:
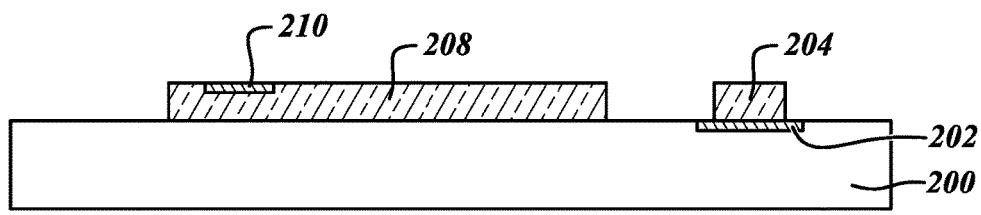

FIG. 6 illustrates the light receiving die 208 and the light transmitting die 204 being coupled to the substrate 200. The light receiving die 208 and the light transmitting die 204 are coupled to the substrate 200 by an adhesive. The adhesive may be a conductive adhesive or a non-conductive adhesive. Furthermore, the adhesive may be glue, a die attach film, solder, or some other adhesion or attachment material. In this embodiment of the process, the light transmitting die 204 is coupled to the contact pad 202 of the substrate 200. The light receiving die 208 is coupled to the substrate 200 adjacent to the light transmitting die 204.

Figure 7:
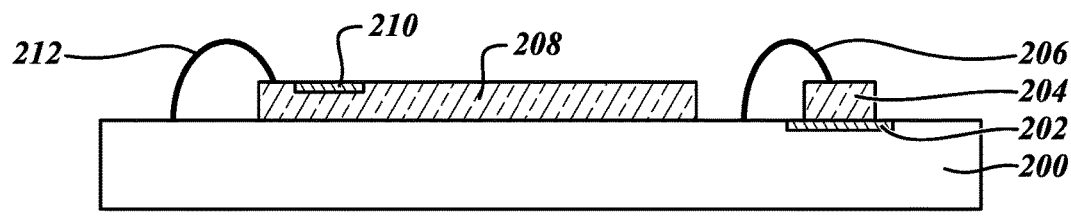

After the light receiving die 208 and the light transmitting die 204 are coupled to the substrate 200, electrical connections 206, 212 are formed as illustrated in FIG. 7. The electrical connections 206, 212 in this embodiment of the proximity sensor are a plurality of wires. The electrical connections 206, 212 couple the light transmitting die 204 and the light receiving die 208 to the electrical components in the substrate 200. These electrical components may be electrical traces or electrical connections that couple the dice 204, 208 to the contact pads of the substrate 200 so the completed proximity sensor 400, 500, 600, 700 may be mounted within an electronic device. The electrical connections 206, 212, which are a plurality of wires in this embodiment, may be formed by wire bonding or some other wire formation technique. The electrical connections 206, 212 may be made of copper, aluminum, gold, nickel, or some other conductive material or combination of conductive materials. Also, the electrical connections in alternative proximity sensor embodiments may be formed by solder or some other electrical connection technique.

Figure 8:
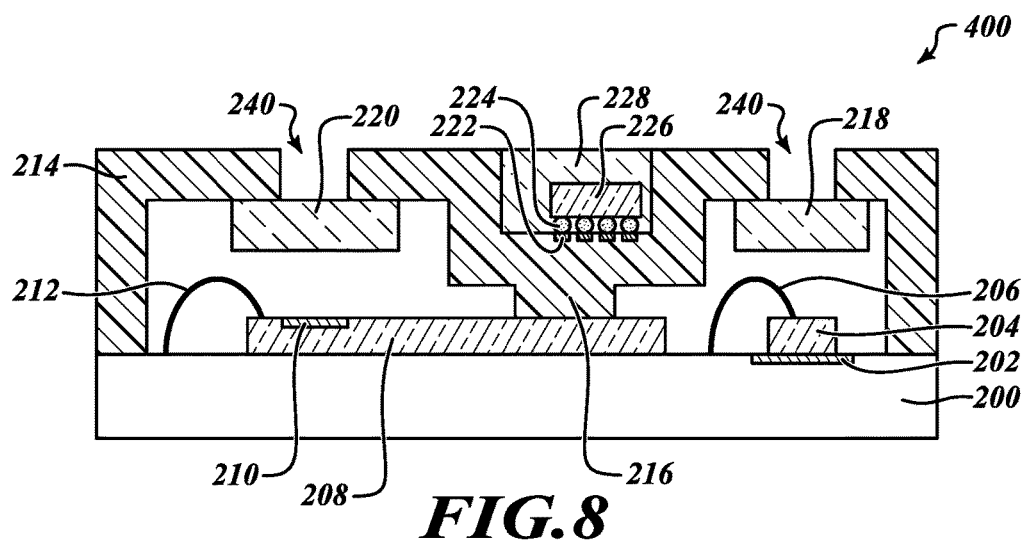

After forming the electrical connections 206, 212, the cap 214 that includes the ambient light sensor 226 is formed, and the cap 214 is then coupled to the substrate 200 and the light receiving die 208 as illustrated in FIG. 8.

The cap 214 may be made of a plastic, a ceramic, a non-conductive encapsulant material, a non-conductive molding compound material, an insulating material or some other non-conductive material. Furthermore, the cap 214 may be made of an opaque material, a material that is coated with an opaque material, or some other material that does not allow light to pass through it. The cap 214 may be formed by compression molding, injection molding, or some other cap formation technique. The cap 214 is formed to include contact pads 222 and electrical traces coupling the contact pads 222 to the substrate 200, to the light transmitting die 204 and to the light receiving die 208. Furthermore, the electrical traces will couple the ambient light sensor 226, the substrate 200, the light receiving die 208, and the light transmitting die 204 as appropriate. After the cap 214 is formed, a recess 228 and apertures 240 are formed in the cap 214. The recess 228 is formed between the apertures 240. The recess 228 may be a divot, a slot, or some other recess for receiving the ambient light sensor 226. The recess 228 and the apertures 240 may be formed by removing material through a saw, a laser, or some other cutting technique or removal technique. Alternatively, the recess 228 and the apertures 240 may be formed at the exact same time as the cap 214 during the injection molding process or the compression molding process. Similarly, the apertures 240 may be formed at the same time as the cap 214 during the injection molding process or the compression molding process, and then the recess 228 may be formed by cutting away or removing material from the cap 214 afterwards. Also, in an alternative process, the recess 228 may be formed at the same time as the cap 214 during the injection molding process or the compression molding process, and then the openings may be formed by cutting away or removing material from the cap 214 afterwards. In other words, the components of the cap can be formed in various combinations or orders.

Once the recess 228 and the apertures 240 are formed, the ambient light sensor 226 is coupled to the cap 214. More specifically, the ambient light sensor is coupled to the contact pads 222 within the recess 228 of the cap 214. The ambient light sensor 226 may be coupled to the contact pads 222 by solder balls 224. Alternatively, as shown and described earlier in FIG. 4, the ambient light sensor 226 may be coupled to the cap 214 by an adhesive, and then coupled to the contact pads by electrical connections 230, the electrical connections 230 being wires.

After the ambient light sensor 226 is coupled to the cap 214 and the contact pads 222 within the recess 228, a transparent material is formed in the recess 228 to encase the ambient light sensor 226 and the solder balls 224. By forming a transparent material in the recess 228 that encases the ambient light sensor 226 and the solder balls 224, the ambient light sensor 226 is protected and is mechanically stable within the cap 214. The transparent material encasing the solder balls 224 and the ambient light sensor 226 will protect the solder balls 224 and the ambient light sensor 266 from debris and external stresses. The transparent material in the recess 228 allows light to pass through unobstructed so the light can reach the ambient light sensor 226 within the recess 228.

Once the transparent material is formed within the recess 228 to encase the ambient light sensor 226 and the solder balls 224, the windows 218, 220 are coupled to the cap 214. More specifically, the windows 218, 220 are coupled to the cap by an adhesive material and are aligned with the apertures 240 of the cap 214. The windows 218, 220 are made of a transparent material that allows light to pass through unobstructed so the light can be emitted by the light transmitting die 204 and can be received by the light receiving portion 210 of the light receiving die 208. Also, the windows 218, 220 protect light transmitting die 204 and the light receiving die 208 from external stresses and debris. However, in an alternative process, the windows may be coupled to the cap before the ambient light sensor 226 is placed within the recess 228 and coupled to the cap 214.

After the cap 214 is formed, the cap 214 is coupled to the substrate and the light receiving die 208. The cap 214 may be coupled to the substrate 200 by an adhesive, laser welding, laser direct soldering, or some other connection technique. The cap 214 includes electrical traces that are coupled to the contact pads 222 within the recess 228. The electrical traces form various connections between the dice 204, 208 and the electrical components within the proximity sensor 400, 500, 600, 700. For example, the electrical traces may form electrical connections between the substrate 200 and the ambient light sensor 226, the electrical traces may form electrical connections between the light receiving die 208 and the ambient light sensor 226, or the electrical traces may form electrical connections between the light transmitting die 204 and the ambient light sensor 226. Additionally, the electrical traces within the cap 214 may form any other electrical connections or combinations of electrical connections as desired within the proximity sensor 400, 500, 600, 700. Furthermore, when the cap 214 is coupled to the substrate 200 and the light receiving die 208, a light barrier 216 of the cap 214 forms a first chamber around the light receiving portion 210 of the light receiving die 208, and a second chamber around the light transmitting die 204. The light barrier 216 is a portion of the cap 214. More specifically, the light barrier 216 is a wall of the cap 214 that is opaque and does not allow light to pass through it. In other words, the light barrier 216 stops cross-talk between the light transmitting die 204 and the light receiving portion 210 of the light receiving die 208. Once the cap 214 is coupled to the substrate and the light receiving die 208, a completed proximity sensor 400 is formed.

Figure 9:
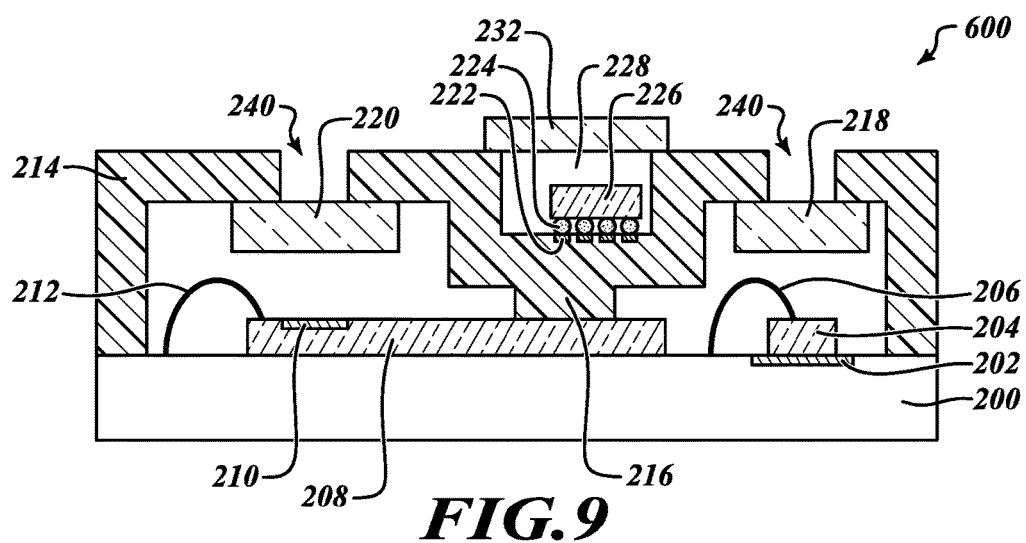
FIG. 9 is an alternative embodiment of a completed proximity sensor formed utilizing a cap with a recess and an ambient light sensor.

FIG. 9 is an alternative embodiment of a completed proximity sensor 600. This alternative completed proximity sensor 600 is very similar to the completed proximity sensor 400 in FIGS. 3 and 8. However, in this alternative embodiment, a third window 232 is coupled to the cap 214. The third window 232 is aligned with the recess 228 and the ambient light sensor 226, and the third window 232 covers the recess 228 and the ambient light sensor 226. The third window 232 is made of a transparent material that allows light to pass through unobstructed and protects the ambient light sensor 226 from debris and external stresses. Also, the third window 232 is coupled to the cap 214 by an adhesive.

Figure 10:
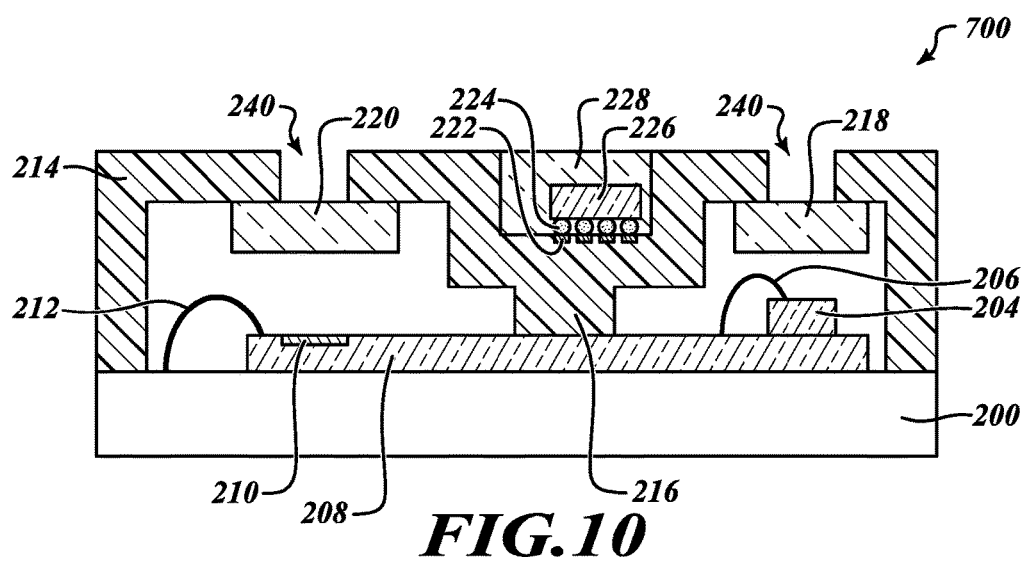
FIG. 10 is an alternative embodiment of a completed proximity sensor formed utilizing a cap with a recess and an ambient light sensor.

FIG. 10 is an alternative embodiment of a completed proximity sensor 700. This alternative embodiment of the completed proximity sensor 700 is very similar to the completed proximity sensor 400 in FIGS. 3, 8 and 9. However, in this alternative embodiment, the light receiving die 208 extends further into the second chamber that contains the light transmitting die 204. The light transmitting die 204 is coupled to a surface of the light receiving die 208 by an adhesive material such as glue, a die attach film or some other adhesive material. Furthermore, the light transmitting die 204 is coupled to the light receiving die 208 by an electrical connection 206, which is a wire. By having the light receiving die 208 extend further into the second chamber that contains the light transmitting die, this alternative embodiment of the completed proximity sensor 700 may be made even smaller than the earlier embodiments and alternative embodiments of the completed proximity sensor 400, 500, 600.

Furthermore, in an alternative embodiment similar to FIG. 10, the light transmitting die 204 may be an integrated element of the light receiving die 208. This allows even smaller completed proximity sensors to be formed.

These various embodiments of a proximity sensor 400, 500, 600, 700 are used to determine if an external object or user is close to a screen of an electronic device or in close proximity of an electronic device in general. However, for discussion purposes, the electronic device will have a screen. If the proximity sensor determines a user is close to the screen, the device will lock the screen to avoid unintended inputs. For example, if a user is making a phone call with a cellphone, the screen of the cellphone will lock up to avoid inputs while the user is making the call. The proximity sensors 400, 500, 600, 700 are able to determine or detect if a user is close to the screen through the combination of the light transmitting die 204, the light receiving die 208 and the ambient light sensor 226.

The light transmitting die 204 may send out pulses of light or may send out a continuous stream of light. This light emitted from the light transmitting die 204 may be infrared light, ultraviolet light, or some other frequency or range of frequencies of light as desired. As the light transmitting die 204 emits light, the light is reflected off various objects in a room or an external environment. The reflected light is received by the light receiving portion 210 of the light receiving die 208. However, the light receiving die only determines that an object is close enough to the screen to lock the screen when the reflected light received is greater than a set threshold value. Therefore, if only a small amount of reflected light is detected by the light receiving portion 210, and this value is not above the threshold value, the screen of the electronic device does not lock up. However, the ambient light of a room or an external environment may cause readings that are incorrect. But because these proximity sensor embodiments 400, 500, 600, 700 include an ambient light sensor 226, the ambient light of a room or an external environment can be compensated for. More specifically, when the light receiving die 208 attempts to determine whether the user is close enough to the screen to warrant locking the screen, the ambient light sensor 226 measures the amount of ambient light within the room or the external environment. In one embodiment, the ambient light sensor's 226 measurement of the external ambient light can then be subtracted from measurement of the reflected light received by the light receiving portion 210 of the light receiving die 208. In turn, by having a proximity sensor 400, 500, 600, 700 that includes a light transmitting die 204, a light receiving die 208, and an ambient light sensor 226 all in one semiconductor package, the screen of a cellphone or electronic device will not lock up at undesired or unintended times when the user is using the cellphone or electronic device due to inappropriate readings or measurements by the various dice 204, 208, 226 within the proximity sensor 400, 500, 600, 700. Having the die 226 provides some benefits in various embodiments. For example, the die 208 already has a light sensor 210 of one type. The die 208 has circuits to process light sensing signals received from the sensor 210. The very same circuits can be used for the ambient light sensor 226, thus saving the need for another die having light processing circuits. Further, when the signal from the ambient light sensor 226 is being subtracted from or combined with the signal from light sensor 210, having them both on the same substrate 200 and sending signals to the same die 208 saves space, distance and extra connections. The signals from die 226 can be carried on electrically conductive lines internal to the cap 214 and connect to the substrate 200 using contact pads between the cap 214 and the substrate 200 where they meet.

Furthermore, in determining whether an external object is close to the electronic device's screen, the proximity sensor 400, 500, 600, 700 must be calibrated to have a threshold value. Once the proximity sensor 400, 500, 600, 700 is calibrated to have a specific threshold value, which may update continuously or may be a set value, the proximity sensor 400, 500, 600, 700 can then determine whether an external object is close the electronic device's screen. More specifically, the ambient light sensor 226 measures an ambient light of an external environment during a first time period. During this first time period, the light transmitting die 204 does not transmit light to avoid cross-talk between the ambient light sensor 226 and the light transmitting die 204. After the ambient light sensor 226 has measured the ambient light of the external environment, the light transmitting die 204 sends out a first frequency of light during a second period of time. This first frequency of light may be pulses of light or may be a continuous stream of light. Additionally, this first frequency of light may be ultraviolet light, infrared light, or some other frequency of light as desired. During this second period of time, the ambient light sensor 226 is not taking measurements. After the first frequency of light has been emitted from the light transmitting die 204, the first frequency of light is then reflected off the external user. This reflected light is then received and measured by the light receiving portion 210 of the light receiving die 208 during a third period of time. During this third period of time, the ambient light sensor 226 is not taking measurements. Once the light receiving die 208 measures the reflected light, a corrected reflected light value is calculated. The corrected reflected light value is the difference between the measurement of the reflected light by the light receiving die 208 and the measurement of the ambient light by the ambient light sensor 226. Once the corrected reflected light value is calculated, the corrected reflected light value is compared with the threshold value. If the corrected reflected light value is greater than the threshold value, then the user is in close proximity of the electronic device's screen and the screen becomes locked. In alternative embodiments of the method described above, the measurements may be taken in any desired order. In addition, the determination of whether the user is in close proximity to the electronic device's screen may be determined by different comparison criteria when comparing the threshold value and the corrected reflected light value.

By utilizing the above method and the embodiments of the proximity sensor 400, 500, 600, 700 disclosed, a compact proximity sensor 400, 500, 600, 700 may be formed to include a light transmitting die 204, a light receiving die 208, and an ambient light sensor 226. In turn, allowing for the proximity sensor to correct measurements effected by the ambient light of an external environment, all while maintaining a small size and reducing the number of packages that need to be manufactured to form a complete proximity sensor, and avoiding incorrect or inappropriate determinations by the proximity sensor when determining if a user is close to an electronic device's screen.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if as desired to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A semiconductor package, comprising:
    a substrate;
    a first semiconductor die coupled to the substrate, the first semiconductor die having a light sensor;
    a light transmitter adjacent to the first semiconductor die;
    a cap overlying the first semiconductor die, the cap including:
        an electrical insulation layer;
        a plurality of electrical traces;
        a first opening aligned with the light sensor of the first semiconductor die;
        a second opening aligned with the light transmitter;
        a first transparent material coupled to the cap and aligned with the first opening;
        a second transparent material coupled to the cap and aligned with the second opening;
        a recess between the first opening and the second opening; and
        electrical contacts positioned in the recess of the cap, the electrical contacts being coupled to the electrical traces;
    an ambient light sensor coupled to the electrical contacts and positioned within the recess of the cap; and
    a third transparent material encasing the ambient light sensor and filling the recess of the cap.

2. The semiconductor package of claim 1, wherein the light transmitter overlies and is coupled to the first semiconductor die.

3. The semiconductor package of claim 1, wherein the light transmitter is coupled to the substrate at a location spaced from the first semiconductor die.

4. The semiconductor package of claim 1, wherein the light transmitter is a second semiconductor die.

5. The semiconductor package of claim 1, wherein the light transmitter is an integrated element in the first semiconductor die.

6. The semiconductor package of claim 1, wherein the light transmitter is a light emitting diode positioned on the first semiconductor die.

7. A semiconductor package, comprising:
    a substrate;
    a first semiconductor die including a light sensor and being coupled to the substrate;
    a second semiconductor die including a light transmitter, the second semiconductor die adjacent to the first semiconductor die;
    a cap coupled to the substrate, the cap including:
        electrical traces;
        a first opening aligned with the light sensor of the first semiconductor die;
        a second opening aligned with the light transmitter of the second semiconductor die;
        a first transparent material coupled to the cap and aligned with the first opening;
        a second transparent material coupled to the cap and aligned with the second opening;
        a recess between the first opening and the second opening; and
        electrical contacts positioned in the recess of the cap, the electrical contacts being coupled to the substrate by the electrical traces;
    a third semiconductor die coupled to the electrical contacts and positioned within the recess of the cap.

8. The semiconductor package of claim 7, wherein the third semiconductor die is an ambient light sensor and further comprising:

a third transparent material that encases the ambient light sensor and fills the recess of the cap.

9. The semiconductor package of claim 8, wherein the third transparent material is coupled to the cap and aligned with the ambient light sensor and the recess of the cap.

10. The semiconductor package of claim 9, wherein the third transparent material and the recess form a chamber surrounding the ambient light sensor.

11. The semiconductor package of claim 7, wherein the substrate includes contact pads electrically coupled to the cap.

12. The semiconductor package of claim 11, wherein the plurality of electrical traces couple the ambient light sensor to the contact pads of the substrate.

13. The semiconductor package of claim 7, wherein the cap includes a light barrier positioned between the light emitting diode and the light sensor.

14. The semiconductor package of claim 13, wherein the light barrier is in contact with a surface of the first semiconductor die.

15. The semiconductor package of claim 14, wherein the cap including the light barrier forms a first chamber that encloses a first portion of the first semiconductor die and a second chamber that encloses a second portion of the first semiconductor die and the second semiconductor die.

16. The semiconductor package of claim 7, wherein the light transmitter is a light emitting diode.

17. A method, comprising:
measuring ambient light of an outside environment by an ambient light sensor in a semiconductor package during a first period of time;
storing a value of the ambient light of the outside environment measured by the ambient light sensor during the first period of time;
emitting a first frequency of light by a light transmitter in the semiconductor package, the first frequency of light passing through a first aperture of the semiconductor package during a second period of time;
measuring reflected light from the first frequency of light emitted by the light transmitter by a light receiver in the semiconductor package during a third period of time, the reflected light being reflected off an external object and passing through a second aperture of the semiconductor package; and
storing a value of the reflected light measured by the light transmitter during the third period of time.

18. The method of claim 17, further comprising determining whether the external object is in close proximity to the semiconductor package.

19. The method of claim 17, further comprising calibrating a threshold value to determine when the external object is in close proximity of the semiconductor package.

20. The method of claim 19, further comprising determining a corrected reflected light value by subtracting the value of the ambient light of the outside environment measured by the ambient light sensor during the first period of time from the reflected light of the first frequency of light measured by the light transmitter during the second period of time.

* * * * *